US011292952B2

(12) United States Patent
Cole et al.

(10) Patent No.: US 11,292,952 B2
(45) Date of Patent: Apr. 5, 2022

(54) ENCAPSULATED PRODUCTION CHEMICALS

(71) Applicants: M-I L.L.C., Houston, TX (US); M-I Drilling Fluids U.K. Limited, Scotland (GB); SCHLUMBERGER NORGE AS, Stavanger (NO)

(72) Inventors: Rachael Cole, Sandnes (NO); Neil Feasey, Hampshire (GB); Chandrashekhar Yeshwant Khandekar, Houston, TX (US); Tore Nordvik, Sandnes (NO); Neil Grainger, Aberdeenshire (GB)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 140 days.

(21) Appl. No.: 16/099,162

(22) PCT Filed: May 3, 2017

(86) PCT No.: PCT/US2017/030745
§ 371 (c)(1),
(2) Date: Nov. 5, 2018

(87) PCT Pub. No.: WO2017/192658
PCT Pub. Date: Nov. 9, 2017

(65) Prior Publication Data
US 2019/0211249 A1    Jul. 11, 2019

Related U.S. Application Data

(60) Provisional application No. 62/331,870, filed on May 4, 2016.

(51) Int. Cl.
| | |
|---|---|
| *C09K 8/12* | (2006.01) |
| *C09K 8/035* | (2006.01) |
| *C09K 8/524* | (2006.01) |
| *C09K 8/528* | (2006.01) |
| *C08G 83/00* | (2006.01) |
| *C08L 71/02* | (2006.01) |

(52) U.S. Cl.
CPC ............... *C09K 8/12* (2013.01); *C09K 8/035* (2013.01); *C08G 83/004* (2013.01); *C08L 71/02* (2013.01); *C08L 2207/324* (2013.01); *C09K 8/524* (2013.01); *C09K 8/528* (2013.01); *C09K 2208/20* (2013.01); *C09K 2208/22* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 3,347,789 A | 10/1967 | Dickson | |
| 5,466,387 A | 11/1995 | Pianta et al. | |
| 5,504,063 A | 4/1996 | Becker et al. | |
| 5,700,395 A | 12/1997 | Thetford et al. | |
| 5,998,565 A * | 12/1999 | de Brabander-van den Berg ....... C08K 9/10 528/176 |
| 6,140,276 A | 10/2000 | Duncum et al. | |
| 6,764,980 B2 | 7/2004 | Bates et al. | |
| 6,787,600 B1 | 9/2004 | Thetford et al. | |
| 6,905,605 B2 | 6/2005 | Klomp | |
| 7,985,424 B2 | 7/2011 | Tomalia et al. | |
| 8,183,184 B2 | 5/2012 | Berkland et al. | |
| 8,372,786 B2 | 2/2013 | Berkland et al. | |
| 9,103,039 B2 | 8/2015 | Jenkins et al. | |
| 2002/0188040 A1* | 12/2002 | Chen ...................... D21H 21/56 524/35 |
| 2006/0106265 A1 | 5/2006 | Rivers et al. | |
| 2007/0027046 A1 | 2/2007 | Friend et al. | |
| 2007/0124990 A1 | 6/2007 | Chheda | |
| 2008/0032902 A1* | 2/2008 | Rivers ...................... C09K 8/52 507/202 |
| 2008/0058229 A1 | 3/2008 | Berkland et al. | |
| 2008/0096772 A1 | 4/2008 | Wilkes et al. | |
| 2011/0070451 A1* | 3/2011 | Khanna ................... B32B 17/06 428/428 |
| 2011/0130312 A1 | 6/2011 | Notte et al. | |
| 2011/0272142 A1 | 11/2011 | Lewis et al. | |
| 2013/0255951 A1 | 10/2013 | Little et al. | |
| 2015/0128484 A1 | 5/2015 | Nordvik et al. | |
| 2016/0075941 A1 | 3/2016 | Duenckel et al. | |
| 2016/0222278 A1 | 8/2016 | Cole et al. | |
| 2017/0114272 A1* | 4/2017 | Vo .......................... C09K 8/706 |
| 2018/0223180 A1* | 8/2018 | Hall ........................ C09K 8/725 |
| 2018/0305609 A1* | 10/2018 | Hall ........................ C09K 8/80 |

FOREIGN PATENT DOCUMENTS

| | | | | |
|---|---|---|---|---|
| WO | WO-9719987 A1 * | 6/1997 | ............. C08L 23/02 |
| WO | 9723547 A1 | 7/1997 | |
| WO | 1998021446 | 5/1998 | |
| WO | 2004022909 A1 | 3/2004 | |
| WO | 2006047745 A1 | 5/2006 | |
| WO | 2008/017007 A2 | 2/2008 | |
| WO | 2012175622 A1 | 12/2012 | |
| WO | 2013019704 A1 | 2/2013 | |
| WO | 2013096201 A1 | 6/2013 | |
| WO | 2014065675 A1 | 5/2014 | |

OTHER PUBLICATIONS

International Search Report issued in PCT/US2017/030745 dated Aug. 17, 2017 (3 pages).
Written Opinion of the International Searching Authority issued in PCT/US2017/030745 dated Aug. 17, 2017 (10 pages).
(Continued)

Primary Examiner — John J Figueroa
(74) Attorney, Agent, or Firm — Helene Raybaud

(57) ABSTRACT

A method of performing an oilfield treatment that includes delivering to an oilfield fluid a host-guest complex, wherein the host-guest complex is formed from a solution of host molecule mixed with a guest molecule having opposing solubility from the host molecule; wherein the host molecule is present in the solution in an amount of at least $2 \times 10^{-6}$ M.

15 Claims, No Drawings

(56) References Cited

OTHER PUBLICATIONS

Irfan et al., (2010) Encapsulation using hyperbranched polymers: From Research and Technologies to Emerging Applications, Ind. Eng. Chem. Res. 2010, 49, 1169-1196.
International Preliminary Report on Patentability issued in PCT/US2017/030745 dated Nov. 6, 2018 (11 pages).
Han et al., Host-Guest Supramolecular Chemistry of Dendritic macromolecules, Current Organic Chemistry, 2011, 15, pp. 2-26.
Kramer, et al., Dendritic Polyamine Architectures With Lipophilic Shells as Nanocompartments for Polar Guest Molecules: A Comparative Study of their Transport Behavior, Journal of Polymer Science, Part A: Polymer Chemistry, 2007, 45, pp. 2287-2303.
Zou, et al., Encapsulation Mechanism of Molecular Nanocarriers Based on Unimolecular Micelle Forming Dendritic Core-Shell Structural Polymers, Journal of Physical Chemistry B, 2006, 110, pp. 2638-2642.
International Search Report and Written Opinion issued in the PCT Application PCT/US2015/058991, dated Jan. 18, 2016 (13 pages).
International Preliminary Report on Patentability issued in the PCT Application PCT/US2015/058991, dated May 18, 2017 (9 pages).
Examination Report issued in the CA Application 2966532 dated Jan. 23, 2019 (3 pages).
Examination Report issued in the CA Application 2966532 dated Sep. 25, 2019 (3 pages).

\* cited by examiner

ENCAPSULATED PRODUCTION CHEMICALS

BACKGROUND

During the production of hydrocarbons from a reservoir, chemical and physical changes may occur within the fluids from the well as they are transported from the reservoir and through a processing system. Fluids produced from a well may be a mixture of liquid hydrocarbons, gaseous hydrocarbons, water and various solids and chemicals. Rapid changes in temperature, pressure and agitation can create changes in the fluid characteristics that can affect the efficiency of the overall production and processing system. Problems that arise as a result of these changes to the fluid characteristics may include deposition of undesired matter in a system, for example, scales, corrosion products, paraffin wax, asphaltenes, napthenates and gas hydrates. Generally, production chemicals are required to mitigate or overcome these types of problems.

Production chemicals, as used herein, may refer to any chemical, composition, formulation, or the like, utilized to support and/or enhance the production, processing, and/or transportation of petroleum products. Generally, production chemicals may include, but are not limited to, chemicals and/or compositions to inhibit one of corrosion, emulsion(s), gas hydrates, scale, bacteria, foam, wax, paraffin, asphaltenes, grease build-up, heterogeneous material build-up, and/or hydrogen sulfide. Many factors may be considered before selecting the appropriate production chemical or combination of chemicals, including, but not limited to, performance, environmental restrictions, compatibility, stability and cost.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of performing an oilfield treatment that includes delivering to an oilfield fluid a host-guest complex, wherein the host-guest complex is formed from a solution of host molecule mixed with a guest molecule having opposing solubility from the host molecule; wherein the host molecule is present in the solution in an amount of at least $2 \times 10^{-6}$ M In another aspect, embodiments disclosed herein relate to an oil-field treatment composition that includes an aqueous base fluid; and a host molecule encapsulating a guest molecule, wherein the guest molecule is not independently soluble in the aqueous base fluid.

In yet another aspect, embodiments disclosed herein relate to a method of treating a fluid that includes adding an oil-field treatment composition to a hydrocarbon fluid; wherein the oil-field treatment composition includes an aqueous base fluid; and a host molecule encapsulating a guest molecule, wherein the guest molecule is not independently soluble in the base fluid.

Other aspects and advantages of the claimed subject matter will be apparent from the following description and the appended claims.

DETAILED DESCRIPTION

Embodiments of the present disclosure relate generally to encapsulation of production chemicals within host molecules. In more specific embodiments, the present disclosure relates to encapsulation of a first production chemical whereby a branched polymer (e.g., dendrimer) serves as both a host/encapsulant and a second production chemical, such as, for example, a pour point depressant (i.e., wax inhibitor) and/or an asphaltene dispersant. Thus, embodiments of the present disclosure may advantageously allow for the simultaneous introduction of two different production chemicals into a production stream or equipment, where the two different production chemicals being simultaneously introduced through the host/guest relationship may not be otherwise compatible to be delivered together, i.e., combining water soluble and oil-soluble compounds into a single product. Thus, a single treatment composition may be multi-functional. The compositions of the present disclosure may be used to treat an oil-based or aqueous-based fluids.

For purposes herein, an oil-based fluid refers to any fluid which comprises a hydrocarbon. Oil-based fluids of the present disclosure may include crude oil, crude oil condensate, and the various streams which are produced during extraction of hydrocarbons from wells. Also included are refined streams including various fuel oils, diesel fuel, kerosene, gasoline, and the like. Aqueous-based fluids of the present disclosure may include tap water, produced water from a reservoir, sea water, brines, and the like. Further, it is envisioned that aqueous-based fluids of the present disclosure may include at least some water miscible compounds, such as, alcohols.

Host Molecules

Host molecules disclosed herein may be in the form of branched (e.g., hyperbranched) polymers and may include dendrimer systems which may accommodate and encapsulate guest molecules. Dendrimeric compounds are generally three-dimensional, highly branched oligomeric or polymeric molecules comprising a core, a number of branching generations and an external surface composed of end groups. A branching generation is composed of structural units which are bound radially to the core or to the structural units of a previous generation and which extend outward from the core. The structural units may have at least two reactive monofunctional groups and/or at least one monofunctional group and one multifunctional group. The term "multifunctional" is understood as having a functionality of about 2 or higher. To each functionality a new structural unit may be linked, a higher branching generation being produced as a result. The structural units can be the same for each successive generation but they can also be different. The degree of branching of a particular generation present in a dendrimeric compound is defined as the ratio between the number of branchings present and the maximum number of branchings possible in a completely branched dendrimer of the same generation. In one or more embodiments, the degree of branching may range from about 0.5 to 1. Branchings may occur with greater or lesser regularity and the branchings at the surface may belong to different generations depending on the level of control exercised during synthesis. Dendrimeric compounds may have defects in the branching structure, may also be branched asymmetrically or have an incomplete degree of branching in which case the dendrimeric compound is said to contain both functional groups and functional end groups. The term "functional end groups" of a dendrimeric compound refers to those reactive groups which form part of the external surface. In one or more embodiments, the number of functional end groups is at least 6, 8, 12, 16, 20, 24, 32, 36, 40, 76, 148, 200, 300, or 376.

In one or more embodiments, the host molecule may be at least one of a polyester polyol dendrimer (e.g., BOL- TORN™ type, available from Perstorp), a polyethylenimine (PEI) dendrimer, a hyperbranched polyglycerol, polyamidoamine (PAMAM) dendrimers, poly (glycerol succinic acid) (PGLSA) dendrimers, and poly(propylene imine) (DAB).

An example of the chemical structure of a polyester polyol dendrimer is shown below.

in order to render the dendrimer highly soluble in oil-based fluids the functional end groups making up the outer surface of the dendrimer may be functionalized with at least one oil-soluble functional group. In one or more embodiments, the oil-soluble functional group may be selected from fatty acids (e.g., fatty acids with at least 8 carbons) including

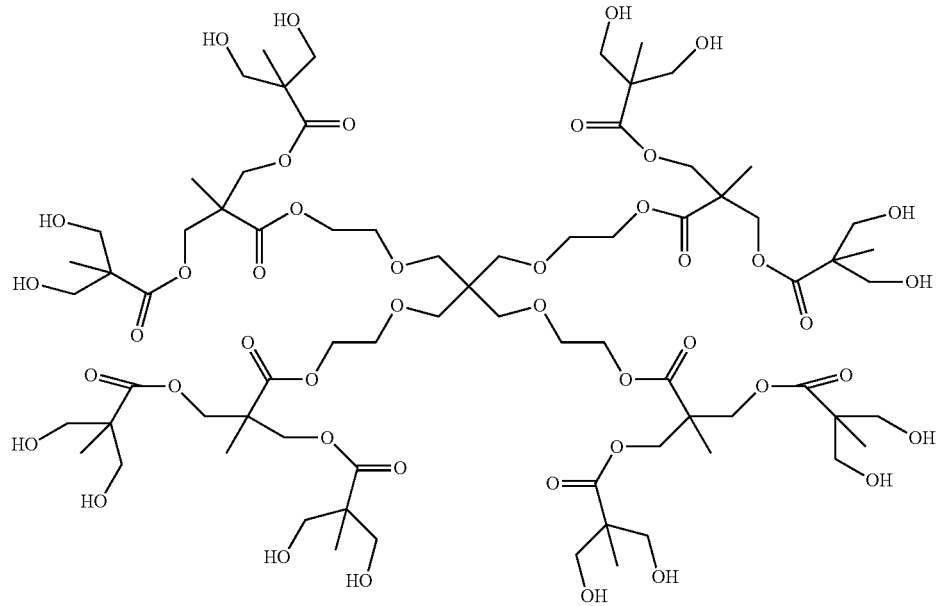 [SMILES: CC(CO)(CO)C(=O)OCC(C)(COC(=O)C(C)(CO)CO)C(=O)OCCOCC(COCCOC(=O)C(C)(COC(=O)C(C)(CO)CO)COC(=O)C(C)(CO)CO)(COCCOC(=O)C(C)(COC(=O)C(C)(CO)CO)COC(=O)C(C)(CO)CO)COCCOC(=O)C(C)(COC(=O)C(C)(CO)CO)COC(=O)C(C)(CO)CO]

An example of the chemical structure of a polyethylenimine (PEI) type dendrimer is shown below.

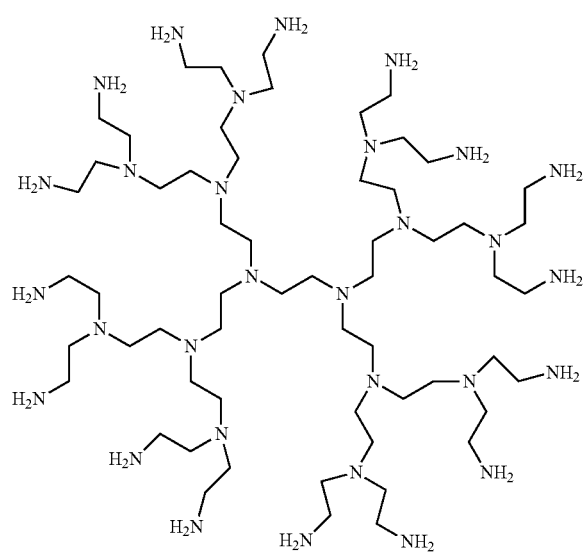 [SMILES: NCCN(CCN)CCN(CCN(CCN)CCN)CCN(CCN(CCN(CCN)CCN)CCN(CCN)CCN)CCN(CCN(CCN(CCN)CCN)CCN(CCN)CCN)CCN(CCN(CCN)CCN)CCN(CCN)CCN]

In one or more embodiments, the branched polymers or dendrimers of the present disclosure may have at least some of their terminal or functional end groups (i.e., their outer surface) functionalized with specific chemical moieties in order to provide improved solubility within an oil-based fluid or a water-based fluid, depending upon the application, and/or to provide for end-use functionality as a production chemical. For example, while the dendrimers may have an inherent solubility in oil-based fluids and water-based fluids, polymers thereof (such as poly(12-hydroxystearic acid)), polyisobutylene succinimides (PIBSA), polyisobutylene succinic anhydride, alkyl epoxides, 2,2-bis(hydroxymethyl) propionic acid (BHP), propylene oxide groups, and/or alkyl ether carboxylic acids. Conversely, in order to render the dendrimer highly soluble in water-based fluids the chemical groups making up the outer surface of the dendrimer may be functionalized with at least one water-soluble functional group. In one or more embodiments, the at least one water-soluble functional group may be selected from succinic anhydride, phosphonic acid, caprolactone, caprolactam, carboxylic acids, phosphate groups, alcohol groups, amide groups, amine groups, quaternized amine groups (e.g., quaternized with alkyl groups), imidazolines, ethylene oxide groups, polyethylene glycol, and polylactic acid, sulfonic acid groups.

In general the dendrimers may be functionalized with the above functional groups by any suitable chemical reactions. For example, a polyester polyol type dendrimer may be functionalized with fatty acids such as palmitic acid, stearic acid or behenic acid, by way of acid catalyzed esterification. Or a polyethylenimine type dendrimer may be functionalized with fatty acids such as palmitic acid, stearic acid or behenic acid via an amidation reaction.

In one or more embodiments, the degree of functionalization of the dendrimers may be controlled in order to tailor the solubility, encapsulation ability, and/or other properties of the dendrimer. For example, the amount of end groups on the surface (e.g., those that are capable of being functionalized) of a branched polymer or a dendrimer may be determined based upon the branched polymer or dendrimers molecular weight. Once this value is known, a functionalization strategy may be used wherein at least a portion of the available end groups are functionalized. For example, the amount of reagents used, the time allowed for reaction, and/or the temperature may be modulated to achieve a certain degree of functionalization. In some instances, the degree of branched polymer/dendrimer functionalization is indicated as a percent surface coverage. In one or more embodiments, the dendrimers of the present disclosure may be at least 25% functionalized, at least 50% functionalized, at least 75% functionalized, or at least 90% functionalized.

In one or more embodiments, the molecular weight (number average) of the branched polymer/dendrimer or the functionalized branched polymer/dendrimer may be from about 1000 to 80000 g/mol. For example, in one or more embodiments, the polyester polyol may be used at a molecular weight ranging from 1000 to 10000 g/mol. In one or more embodiments, the polyester polyol may have a molecular weight of at least 5000 g/mol for the core without any substitution of the end groups. In one or more embodiments, the polyethyleneimine may be used at a molecular weight ranging from 1000 to 80000 g/mol, or from about 2000 to 60000 g/mol, or from about 3000 to 45000 g/mol, or from about 4000 to 37500 g/mol, or from about 4750 to 30000.

In one or more embodiments, the functionalization of the branched polymer/dendrimer may not only impart a desired solubility, but may also impart a functionality that can be useful downhole, in a pipeline, or other production equipment. For example, in one or more embodiments, the functionalization of the branched polymer/dendrimer by fatty acids (e.g., fatty acids with at least 8 carbons), polyisobutylene succinimides, (PIBSA) poly(12-hydroxystearic acid), alkyl epoxides, 2,2-bis(hydroxymethyl) propionic acid (BHP), and alkyl ether carboxylic acids may impart oil-soluble asphaltene/wax inhibition and/or pour point depressant, properties to the branched polymer/dendrimer. In one or more embodiments, the degree of functionalization may determine the specific properties that are achieved. For example, a higher degree of functionalization (i.e. percentage coverage) may be most beneficial for wax inhibition. Functionalization by propoxylation (optionally with ethoxylation) or alkyl ether carboxylic acids may provide oil-soluble demulsifier properties to the branched polymer/dendrimer.

For example, in one or more embodiments, an oil-soluble asphaltene dispersant host molecular may include polyester polyol dendrimers functionalized with fatty acids, PEI dendrimers functionalized with fatty acids, PEI dendrimers functionalized with PIBSA, PEI dendrimers functionalized with poly(12-hydroxystearic acid), polyglycerol functionalized with fatty acids, polyamidoamine (PAMAM) dendrimers functionalized with alkyl epoxides, or PEI functionalized with alkyl epoxides.

In one or more embodiments, an oil-soluble pour point dispersant/wax inhibitor host molecule may include polyester polyol dendrimers functionalized with fatty acids, PEI dendrimers functionalized with fatty acids, PEI dendrimers functionalized with 2,2-bis(hydroxymethyl)propionic acid (BHP) and fatty acids, polyglycerol functionalized with fatty acids, polyamidoamine (PANAM) dendrimers functionalized with alkyl epoxides, or PEI functionalized with alkyl epoxides.

In one or more embodiments, an oil-soluble demulsifier host molecule may include polyester polyol dendrimers functionalized with EO/PO, polyester polyol dendrimers functionalized with alkyl ether carboxylic acids, PEI functionalized with EO/PO, or PEI functionalized with alkyl ether carboxylic acids.

In one or more embodiments, the functionalization of the branched polymer/dendrimer by succinic anhydride, phosphonic acid, caprolactone, caprolactam, and/or carboxylic acid termination may impart water-soluble scale inhibition properties. Functionalization by amines, quaternized amine groups (e.g., quaternized with alkyl groups), and/or imidazolines may provide water-soluble corrosion inhibition. Functionalization by ethoxylation (alone and/or with some degree of propoxylation), polyethylene glycol, polylactic acid, succinic anhydride, caprolactone, and methacrylates may impart water-soluble demulsifier properties. Functionalization by caprolactam and formaldehyde may provide water soluble gas hydrate inhibition properties to the branched polymer/dendrimer.

In one or more embodiments, a water-soluble scale inhibitor host molecule may include polyester polyol dendrimers functionalized with succinic anhydride, PEI dendrimers functionalized with phosphoromethylation, poly(glycerol succinic acid) (PGLSA) dendrimers, polyester polyol dendrimers functionalized with caprolactone and succinic anhydride, or DAB dendrimer functionalized with carboxylic acid termination.

In one or more embodiments, a water-soluble corrosion inhibitor host molecule may include polyester polyol dendrimers functionalized with amines or quaternary amines, PEI dendrimers functionalized with imidazolines, PEI dendrimers quaternised with alkyl groups (eg. RX), or polyglycerol functionalized with quaternised amine groups.

In one or more embodiments, a water-soluble demulsifier host molecule may include polyester polyol dendrimers functionalized with EO (eg. with polylactide and polyethylene glycol), PEI dendrimers functionalized with EO/PO, PAMAM/PEG Dendrimers, poly(styrene-ethylene oxide), polyester polyol dendrimers functionalized with Caprolactone, succinic anhydride, and PEO, or polyester polyol dendrimers functionalized with different functionalized methacrylates (including EO).

In one or more embodiments, a water-soluble gas hydrate inhibitor host molecular may include PEI dendrimers functionalized with caprolactam and formaldehyde.

Further, while the above specific combinations of dendrimers and functionalizations are specifically recited, it is also envisioned that other combinations of dendrimers and functional groups beyond that which is specifically recited may be used, including different functional groups for the identified dendrimers and different dendrimers with the identified functional groups.

Guest Molecules

In one or more embodiment, the guest molecules to be encapsulated will have solubilities opposing those of the host molecule. For example, if a host molecule is, or has been functionalized to be, soluble in oil-based fluids, then the guest molecule to be encapsulated therein will be soluble in aqueous solutions. Conversely, if a host molecule is, or has been functionalized to be, soluble in aqueous-based fluids, then the guest molecule to be encapsulated therein will be soluble in oil-based solutions. In this way, upon encapsulation of a guest molecule by a host molecule, a complex product may be obtained that contains two components that generally are not thought to be capable of mixing/existing in the same phase.

In one or more embodiments, the guest molecules may be at least one chemical useful in the production and/or transportation of crude oil and other petroleum products. For example, the guest molecule may be a corrosion inhibitor, demulsifier, gas hydrate inhibitor, scale inhibitor, biocide/bactericide, defoamer, wax/paraffin inhibitor, asphaltenes dispersant, pour point depressant, anti-agglomerant, hydrogen sulfide scavenger and/or any other chemical that inhibits grease or heterogeneous material build-up.

Water-soluble scale inhibitors may include the phosphonates/organophosphonic acids. For example, hydroxyethyl-amino-di(methylene phosphonic Acid) (HEMPA), aminotris (methylenephosphonic acid) (ATMP), bis(hexamethylene) triamine penta(methylene phosphonic acid) (BHMT), diethylenetriamine penta(methylene phosphonic acid) (DTPMP), 1-hydroxyethane 1,1-diphosphonic acid (HEDP), and hexamethylenediamine-tetra(methylene phosphonic) acid (HDTMP).

Water-soluble corrosion inhibitors may include quaternary amines (including those discussed in U.S. Pat. No. 9,103,039), ethoxylated ester quaternary ammonium cations (e.g., ethoxylated fatty amine/amide/diamine or polyalkoxylated trialkonolamine quaternary salts, alkyl pyridine quaternary ammonium cations, ethoxylated diamines, imidazolines, and phosphate tridecyl ethoxylate triethanolamine salt.

Water-soluble gas hydrate inhibitors may include benzalkonium chloride, polyvinylcaprolactam, vinylpyrrolidone, and combinations or copolymers thereof.

Water-soluble hydrogen sulfide scavengers may include triazines.

Water-soluble biocides/bactericides may include benzalkonium chloride or Tetrakis(hydroxymethyl)phosphonium sulfate (THPS).

Water-soluble demulsifiers may include ethylene oxide/propylene oxide copolymers having a molecular weight below about 2500 g/mol, and amine ethoxylate. Further, ethylene oxide/propylene oxide copolymers may also be formulated to be oil-soluble instead of water-soluble, generally by increasing the relative amount of propylene oxide content.

Oil-soluble wax/asphaltene inhibitors may include ethylene vinyl acetate copolymers, fatty acid diethanolamides, ether carboxylic acids, phosphoric monoesters, compounds that contain amide and carboxylic acid groups, alkyl benzene sulfonic acids, such as dodecylbenzenesulfonate (DDBSA), and their salts The present disclosure is not intended to be limited solely to the guest compounds listed above as they are only listed as examples. In general, the concept presented in this disclosure is not limited to only specific guest chemical compounds and any chemical compound useful for the purposes described above may be encapsulated within a host molecule under the proper conditions and thereby create a complex product that contains components that generally are not thought to be capable of mixing/existing in the same phase.

Host-Guest Composite

In one or more embodiments, a guest molecule may be encapsulated within a host molecule (e.g., branched polymer/dendrimer) by a solvent mixing approach. In the solvent mixing approach, a host molecule is dissolved within either an aqueous-based or oil-based solvent, depending upon its surface functionality, and a guest molecule to be encapsulated is dissolved in solvent that is non-miscible with the host's solvent, thereby forming a two-phase system. The two-phase system may be mixed for a period of time before the two phases are allowed to separate. The exact amount of mixing time may be system dependent and vary depending upon the exact host and guest molecules, their relative concentrations, temperature, etc. If an increased temperature is used, care should be taken to maintain the temperature below the boiling point of the lowest boiling point solvent used. Once the phases separate, at least some of the guest molecules will have been encapsulated by and transferred into the phase occupied by the host molecule. Once again, the amount of guest molecules encapsulated by the host molecule may depend on a variety of factors including the exact host and guest molecules, their relative concentrations, temperature, etc. In one or more embodiments, phase transfer agents may be utilized to facility the encapsulation of guest molecules from one phase into host molecules within a separate phase. Examples of phase transfer agents which may be useful may include quaternary ammonium salts, phosphonium salts, crown ether molecules, polyethylene glycols, and cryptands. More specifically, phase transfer agents may include tetra-n-butylammonium bromide, benzyltrimethylammonium chloride, benzyltriethylammonium chloride, methyltricaprylammonium chloride, methyltributylammonium chloride, methyltrioctylammonium chloride, hexadecyltributylphosphonium bromide, alkyltrimethylammonium bromides. In general, when phase transfer agents are used they are included in amounts of no more than 5% by weight of the phase that the guest molecules are initially solubilized in.

In one or more embodiments, a guest molecule may be encapsulated within a host molecule by a solid mixing approach. In a solid mixing approach, a host molecule is dissolved within either an aqueous-based or oil-based solvent, depending upon its surface functionality, and a guest molecule in solid form is mixed therein. The mixing may occur at room temperature or at an elevated temperature. If the mixing occurs at an elevated temperature, care should be taken to maintain the temperature below the boiling point of the host molecule's solvent. Similar to the solvent mixing approach, phase transfer agents may also be useful when encapsulating guest molecules by the solid mixing approach.

In general, and regardless of the encapsulation approach used, a concentration of host molecule below about $2 \times 10^{-6}$ M or about 0.02 wt %, in its particular phase may not result in any encapsulation or phase transfer of guest molecules.

Without being bound by theory, it is believed that the guest molecules are encapsulated due to a chemical/molecular interaction between the core, or inner portion, of the host molecule and the guest molecules, while the functionality of the shell, or outer portion, of the host molecule is used to transfer the encapsulated guest molecule within a phase that it would not normally be present in, with the host molecule also potentially providing useful properties downhole as well.

Host-Guest Complex Use Downhole

In one or more embodiments, the host-guest complex is delivered downhole or otherwise applied via conventional techniques in a solvent package suitable for the host molecule. Thus, an oil-soluble host molecule will be delivered and formulated into an oil-based fluid, while a water-soluble host molecule will be delivered and formulated into a water-based fluid. It is also envisioned that a complex may be delivered into a different fluid and later exposed to a fluid in which it has solubility. The amount of each host-guest complex used in each fluid may vary depending on the release characteristics of the particular guest molecule, the amount of guest molecule intended to be delivered downhole, and its timeframe for delivery. Each of these variables may be different for each particular combination of host molecule and guest molecule. In general, dosage rates to treat oilfield problems related to the following issues are as indicated: wax inhibition/pour point depression may be from about 100-1000 ppm, asphaltene dispersion may be from about 100 to 200 ppm, hydrogen sulfide scavenger may be from about 10-20 ppm (based on the $H_2S$ concentration), scale inhibition may be from about 1-50 ppm (based on the brine), demulsification may be from about 5-500 ppm, biocide/bactericide may be from about 300 to 500 ppm with a two hour contact time, and hydrate inhibitor may be from about 0.5%-3% by volume based upon the water cut of the produced fluid (wherein 1% is equal to about 10000 ppm). Thus, actual amounts of each host-guest complex (and loading of the guest within the host) used will be best determined by the operator having the particular details of the fluid/issue that is to be treated.

In one or more embodiments, a concentrated solution of host-guest complex may be formulated and added on demand and when needed to deliver a particular dosage to a treating fluid. This dosage form may be useful because it provides the ability to address multiple issues (corrosion inhibition and asphaltene dispersion or inhibition) with one product, whereas commonly used approaches would need two separate products which would not be compatible with each other due to their solubility differences.

Furthermore, the encapsulation of the guest molecule may facilitate its controlled and targeted release. For example, an oil-soluble guest molecule can be encapsulate in a water-soluble host and will only be released from the host molecule upon encountering an oil-based fluid. Thus its application may be targeted directly to the area where it might work best, rather than flooding the particular system with an oil-based fluid to try to deliver the guest molecule where it needs to go. For example, a branched polymer/dendrimer that has been functionalized to act as a corrosion inhibitor may encapsulate a wax inhibitor chemical, with the wax inhibitor chemical released upon contact with the oil-phase. In one or more embodiments, the host-guest complex may be capable of delivering guest molecules over a period of at least 2 hours, or at least 24 hours, or at least 1 week when the host-guest complex is in an environment containing a liquid within which the guest molecule is soluble.

The targeted treatment provided by the use of the host-guest interaction described in the present disclosure may save time and costs during the production process, be capable of avoiding the use of large amounts of organic solvents by instead encapsulating organic soluble compounds in water-soluble hosts, and meet strict health safety and environmental standards. Furthermore, it is envisioned that by encapsulating certain guest molecules that may have stability concerns (e.g., oxidation, adverse reactivity, decomposition, or otherwise lose their effectiveness in their usual solvent or application medium) within a host molecule that their stability may be increased and their use more effectively targeted downhole. Thus, the host-guest complex may serve as a highly adaptable platform providing multi-functional treatment downhole in a targeted manner.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of performing an oilfield treatment, comprising:
   delivering to an oilfield fluid an oil-field treatment composition, comprising:
   a host-guest complex, wherein the host-guest complex is formed from a solution of an aqueous base fluid and host molecule encapsulating a guest molecule having opposing solubility from the host molecule;
   wherein the host molecule is present in the solution in an amount of at least $2 \times 10^6$ M; and
   wherein the guest molecule comprises alkyl benzene sulfonic acid and is not independently soluble in the aqueous base fluid.

2. The method of claim 1, wherein the guest molecule is within a second solution that is not miscible with the first solution.

3. The method of claim 1, wherein the guest molecule is a solid.

4. The method of claim 1, wherein the host molecule is a dendrimer-comprising polyester polyols.

5. The method of claim 1, wherein the host molecule is a dendrimer having a degree of branching of ranging from about 0.5 to 1.

6. The method of claim 1, wherein the host molecule is a dendrimer having at least 6 functional end groups.

7. The method of claim 1, wherein the dendrimer is functionalized with oil-soluble functional groups.

8. The method of claim 7, wherein the oil-soluble functional groups are selected from fatty acids, polyisobutylene succinimides, polyisobutylene succinic anhydride, alkyl epoxides, 2,2-bis(hydroxymethyl) propionic acid, propylene oxide, and/or alkyl ether carboxylic acids.

9. The method of claim 1, wherein the dendrimer is functionalized with water-soluble functional groups.

10. The method of claim 9, wherein the water-soluble functional groups are selected from succinic anhydride, phosphonic acid, caprolactone, caprolactam, carboxylic acids, phosphate groups, alcohol groups, amide groups, amine groups, quaternized amine groups, imidazolines, ethylene oxide groups, polyethylene glycol, sulfonic acid groups, and/or polylactic acid.

11. An oil-field treatment composition, comprising:
    an aqueous base fluid; and a host molecule encapsulating a guest molecule, wherein the guest molecule comprises alkyl benzene sulfonic acid and is not independently soluble in the aqueous base fluid.

12. The composition of claim 11, wherein the host molecule is a dendrimer comprising polyester polyols.

13. The composition of claim 11, wherein the host molecule is functionalized with water soluble functional groups selected from succinic anhydride, phosphonic acid, caprolactone, caprolactam, carboxylic acids, phosphate groups, alcohol groups, amide groups, amine groups, quaternized amine groups, imidazolines, ethylene oxide groups, propylene oxide groups, polyethylene glycol, sulfonic acid groups, and/or polylactic acid.

14. The composition of claim 11, wherein the guest molecule comprises an alkyl benzene sulfonic acid.

15. A method of treating a fluid, comprising:
    adding an oil-field treatment composition to a hydrocarbon fluid; wherein the oil-field treatment composition, comprises:
    an aqueous base fluid; and
    a host molecule encapsulating a guest molecule, wherein the guest molecule is not independently soluble in the base fluid and comprises an alkyl benzene sulfonic acid.

* * * * *